United States Patent [19]

Jones et al.

[11] Patent Number: 5,121,984
[45] Date of Patent: Jun. 16, 1992

[54] MASKING DEVICE FOR USE WITH IMAGE PROJECTORS

[76] Inventors: Mark Jones, 1490 S. Reed, 104-B, Lakewood, Colo. 80226; Robert MacRury, 3550 S. Kendall, Denver, Colo. 80235

[21] Appl. No.: 488,892

[22] Filed: Mar. 5, 1990

[51] Int. Cl.⁵ .............................................. G03B 21/14
[52] U.S. Cl. ...................................... 353/88; 353/122; 353/DIG. 3; 353/97
[58] Field of Search ................ 353/88, DIG. 5, 97, 353/27 R, 121, 24, 22, 23, 122, DIG. 3, DIG. 4

[56] References Cited

U.S. PATENT DOCUMENTS

| | | | |
|---|---|---|---|
| 2,147,260 | 2/1939 | Lewis | 353/88 X |
| 2,357,593 | 9/1944 | Leavell | 353/88 X |
| 3,269,261 | 8/1966 | Porter | 353/DIG. 5 X |
| 3,531,193 | 9/1970 | Diehl | 353/97 X |
| 3,661,449 | 5/1972 | Wright | 353/88 |
| 3,881,815 | 5/1975 | McGourty | |
| 4,523,823 | 6/1985 | Roope | |
| 4,609,268 | 9/1986 | Crawford | |
| 4,688,911 | 8/1987 | Simbal | 353/88 X |
| 4,813,780 | 3/1989 | Solyntjes | 353/88 |

Primary Examiner—Harry N. Haroian
Attorney, Agent, or Firm—Timothy J. Martin; Dana S. Rewoldt

[57] ABSTRACT

A masking device is provided for use with projectors, such as an overhead projector, to selectively block the projection beam that carries an image disposed on a substrate, such as a transparency, for projection onto a viewing screen. The masking device has a framework having preferably guide rails that form slideways receiving a shutter panel. A transparency is aligned by the guide rails and the shutter panel has a leading edge that extends transversely across the aligned transparency so that only the image portion forward of the leading edge is projected. The shutter panel is constructed of a material that inhibits the projectiton beam, but allows the projection to read or view the image portion that is blocked. A base plate of transparent material supports the guide rails and provides a stage on which the transparency may be positioned for projection of the image disposed thereon. Adjustably mounts to retro-fit the masking device on various projectors is described, but the device could be made integrally with the projector.

27 Claims, 7 Drawing Sheets

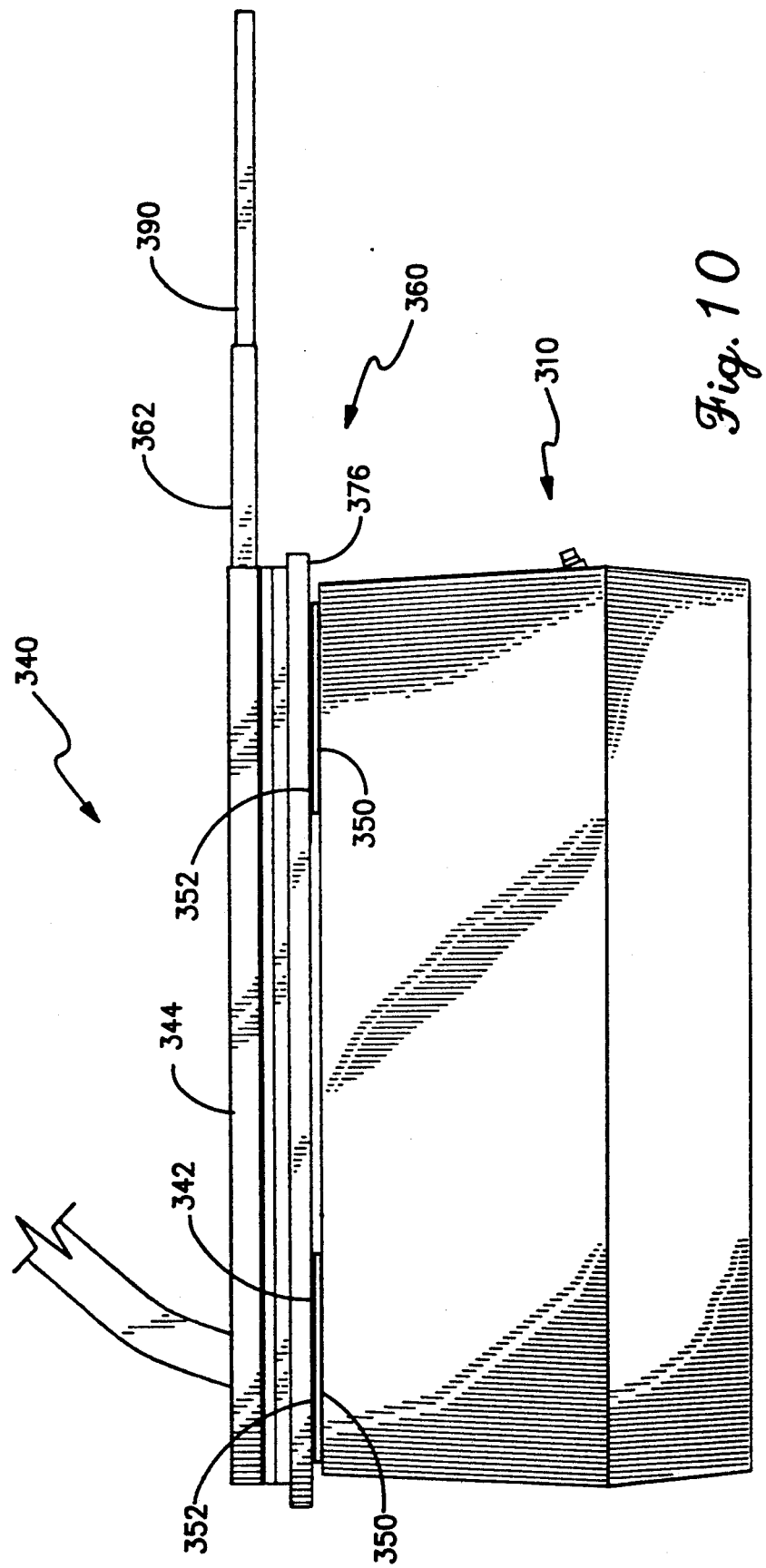

MASKING DEVICE FOR USE WITH IMAGE PROJECTORS

FIELD OF THE INVENTION

The present invention broadly relates to devices which are incorporated in or attached on projectors for use in selectively masking a portion of the image frame that is projected onto a viewing screen for observation. More specifically, the present invention relates to a device which will mask an image during projection so that there is a portion which is blocked and unblocked with respect to the observer yet which image may be seen in the entirety by the person projecting the same. Specifically, the present invention concerns masking devices for use with overhead projectors.

BACKGROUND OF THE INVENTION

Since approximately one hundred years ago, projectors have been used to project an image that is disposed on a substrate material and wherein the substrate material is oriented with respect to the projection apparatus by a frame support. A projection beam of light is then directed at the image and the projection beam is modified by the image on the substrate so that the projection beam, which when striking a viewing surface, reproduces the image so that an observer may see the same. Various optical elements are traditionally employed to direct the projection beam.

Early projection devices have been vastly improved in recent times and have evolved from simple projectors to modern day complex electro-mechanical devices having complex operative mechanisms and optical elements. These various projectors include single frame projectors, such as slide projectors, overhead projectors and the like, to motion projectors wherein a plurality of individual frames are consecutively projected at a sufficient frequency to create the illusion of continuous movement of the images projected in all such devices. Regardless of the complexity of projectors several basic elements are employed. These elements include a light source which creates a projection beam, optical elements that guide the projection beam and a frame support structure which interrupts the projection beam when a substrate containing an image is placed thereon.

Most commonly, the substrate material is a transparency, and the projection beam is transmitted through the transparency such that the projection beam thereafter carries with it the information contained in the image that has been placed on the transparency. The image on the transparency is, accordingly, reproduced on the viewing surface so that a viewer may see a reproduction of the image. The reproduction image is usually substantially larger that the original image so that the viewing surface may be simultaneously viewed by a relatively large number of observers.

In early days, projection devices were primarily employed for amusement, and the present day use of projection apparatus for entertainment purposes can not be underestimated. However, projection devices are now widely used in non-entertainment activities such as business and teaching since it allows the projectionist the ability to employ images disposed on a substrate, hereinafter referred to as a transparency, as a visual accompaniment to an audio presentation. Uses of projection apparatus in these activities often are single frame projectors although moving picture projectors are also used. The present invention primarily concerns the single frame projectors generally and, specifically concerns overhead projectors.

An overhead projector is well-known to be a device wherein a light box houses a light source and some associated optical elements and includes a top horizontal transparent stage or light table that defines a frame support. The projection beam is first projectioned vertically upwardly through a transparency, containing an image, which is placed on a light table. The projection beam containing the image from the transparency is then received by additional optical elements, typically supported vertically above the light table a support post, with these second optical elements defining a projection head which directs the projection beam horizontally onto a vertically oriented viewing surface, such as a movie screen or similar area. The projectionist may then discuss the information contained on the image with the observers who are able to see the image on the viewing screen. With this device, the projectionist can typically read from the transparency and can even use a small pointer to point to items on the transparency while the observers may refer to and see the indexed material on the viewing screen.

It is sometimes the case that the projectionist desires to mask a portion of the transparency so that the observers may only view the unmasked portion of the transparency. Unless otherwise equipped, the projectionist may use, for example, a blocking panel such as piece of paper. That portion of the transparency covered by the panel will be obscured from the view of the observers in that the projection beam is blocked. The edge of the panel may further be used as a line of demarcation between the masked and unmasked portion and can serve to highlight certain information contained on the transparency.

Recognizing the disadvantages and awkwardness of utilizing a piece of paper or other material as a masking panel, others in the past have developed devices which operate selectively to mask and unmask portions of the projected image. These masking apparatus have been employed at various locations along the path of the projection beam to interrupt that beam. One such apparatus is shown in U.S. Pat. No. 3,661,449 issued May 9, 1982 to Wright. The Wright Patent describes a shutter assembly which may be employed with an overhead projector with this shutter assembly being supported directly on the light table, intermediate the light table and the projector head, or forwardly of the projector head. In any event, the shutter apparatus taught in the Wright Patent includes a framework having an opening through which the projection beam may pass and a plurality of shutters which are slideably received in the framework. The shutters divide the image area into quadrants which may be selectively masked and unmasked. Where the shutter assembly in this patent is employed directly on the light table, the device includes an upper transparent sheet of glass or plastic which defines an auxillary stage to support the transparency, and the shutter panels then slide in the region between the light table of the projection apparatus and the auxillary stage of the shutter assembly.

U.S. Pat. No. 4,523,823 issued Jun. 18, 1985 to Roop discloses a shutter device for an overhead projector. Here, the projection head of an overhead projector is provided with a flip panel of opaque material which is movable between a raised position allowing passage of the projection beam to a free hanging vertical position that it blocks the projection beam. This device is used primarily to either unblock or block the entire image so that the need to continuously turn the projector on and off to disable the projection beam, is removed.

Other prior art devices utilize different projecting or viewing apparatus other than overhead projectors, are shown in U.S. Pat. No. 3,881,815 issued May 6, 1975 to McGourty, U.S. Pat. No. 4,609,268 issued Sep. 2, 1986 to Crawford and U.S. Pat. No. 4,813,780 issued Mar. 21, 1989 to Solyntjes. In the devices shown in each of these patents, some sort of sliding structure, either to move a substrate or to define a blocking panel, is employed in conjunction with frame support.

Despite the improvements shown in the above described devices, there remains a need for an improved masking device which may be constructed as either original equipment on an overhead projector or as an auxillary device which may retro-fit on existing overhead projectors. In any event, there is a need for a masking device which is more user friendly; for example, there is a need for such a device to permit the projectionist to view an entire transparency while nonetheless blocking portions of the projection beam so that the observers do not see the entire image. Naturally, the usefulness of such masking devices would be enhanced where their construction were made simply and relatively inexpensively.

SUMMARY OF THE INVENTION

It is an object of the present invention to provide a new and useful masking device which can be constructed either as a permanent feature of an overhead projector or as an independent device selectively mountable onto a projection apparatus.

Another object of the present invention is to provide a masking device which is easy to use from a mechanical standpoint.

Yet another object of the present invention is to provide a masking device which allows the projectionist full view of a transparency and the image thereon while permitting selective blocking from view by the observers of a desired portion of the projected image on the viewing surface.

Another object of the present invention is to provide a masking device useful on a projector to square and align a transparency for projection.

A still further object of the present invention is to provide an independent masking apparatus which may be secured to and removed from a variety of different overhead projectors and which is constructed in such a way as to minimize the risk of damage to the transparency stage of the overhead projectors light table.

It is yet a further object of the present invention to provide a masking device of inexpensive construction so as to be economically available to institutions, such as schools, having limited budgets.

The present invention therefore, is directed to a masking device that is adapted to be used in conjunction with a projection apparatus, either as a retro-fit device or as originally equipment manufactured as part of the projection apparatus construction. The masking device includes a framework assembly mountable on the projection apparatus proximate the frame support thereof which receives and supports a transparency on which an image is disposed. The framework assembly has an open region through which the projection beam from the light source is passed so that the image may be projected therethrough, and first and second facing slideways are provided parallel to one another on opposite sides of the opening. A shutter panel is provided, and is slideably received by the slideways and is movable between a masked positioned wherein the projection beam is substantially inhibited and an unmasked position wherein the projection beam is transmitted. The shutter panel has a leading edge that extends across the opening from the first slideway to the second slideway, perpendicularly thereto whereby the leading edge defines a continuous line of demarcation across the open region. The leading edge of the shutter panel thus separates the open region into a leading portion and a trailing portion. The leading portion is located forwardly of the leading end is unmasked relative to the projection beam. The trailing portion of the open region is behind the leading edge and is masked relative to the projection beam.

Preferably, the first and second slideways are formed of a pair of identical, S-shaped guide rails which are symmetrically mounted to define facing channels which slideably receive opposite side edges of the shutter panel. The S-shaped guide rails each have a lower portion proximate the frame support which are operative to permit the transparency to be aligned relative to the leading edge of the shutter panel and to the frame support so that the image projected on the viewing surface is properly oriented. Further, the shutter panel is formed of an optical material which permits full view of the masked portion of the transparency while blocking viewing surface. Preferably, a smooth, uninterrupted, transparent base plate is provided to mount across the frame support to define an auxillary stage for the transparency, and the guide rails are directly secured to this base plate. Thus, the transparency is support between the base plate and the shutter panel during use. In the preferred construction, mounting elements may be provided on the base plate to secure the masking device to the frame support of the projection apparatus. These mounting elements may include adjustable mounts which allow the masking device to retro-fit onto different projection apparatus having different sized frame supports such as the difference sized light boxes of overhead projectors.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 10 is a side view in elevation, similar to FIG. 4, showing an alternate slide suspension support for the shutter panel.

DETAILED DESCRIPTION OF THE EXEMPLARY EMBODIMENT

The present invention concerns a masking device used in conjunction with projectioning apparatus and, in the exemplary embodiment, is described specifically with respect to an overhead projector. It should be understood by the ordinarily skilled person in this field that the teachings of this invention could be incorporated in other types of projection apparatus, so that despite the reference herein to an overhead projector, the present invention is by no means so limited. However, it should also be understood that the present invention has specific usefulness and advantages not heretofore contained when used in conjunction with an overhead projector. It should also be recognized by the skilled person that the present invention, while described as an independent, retro-fit structure adapted to releasably mount on an overhead projector, the structure of the present invention could be built as original equipment on projection apparatus.

Figure 1:
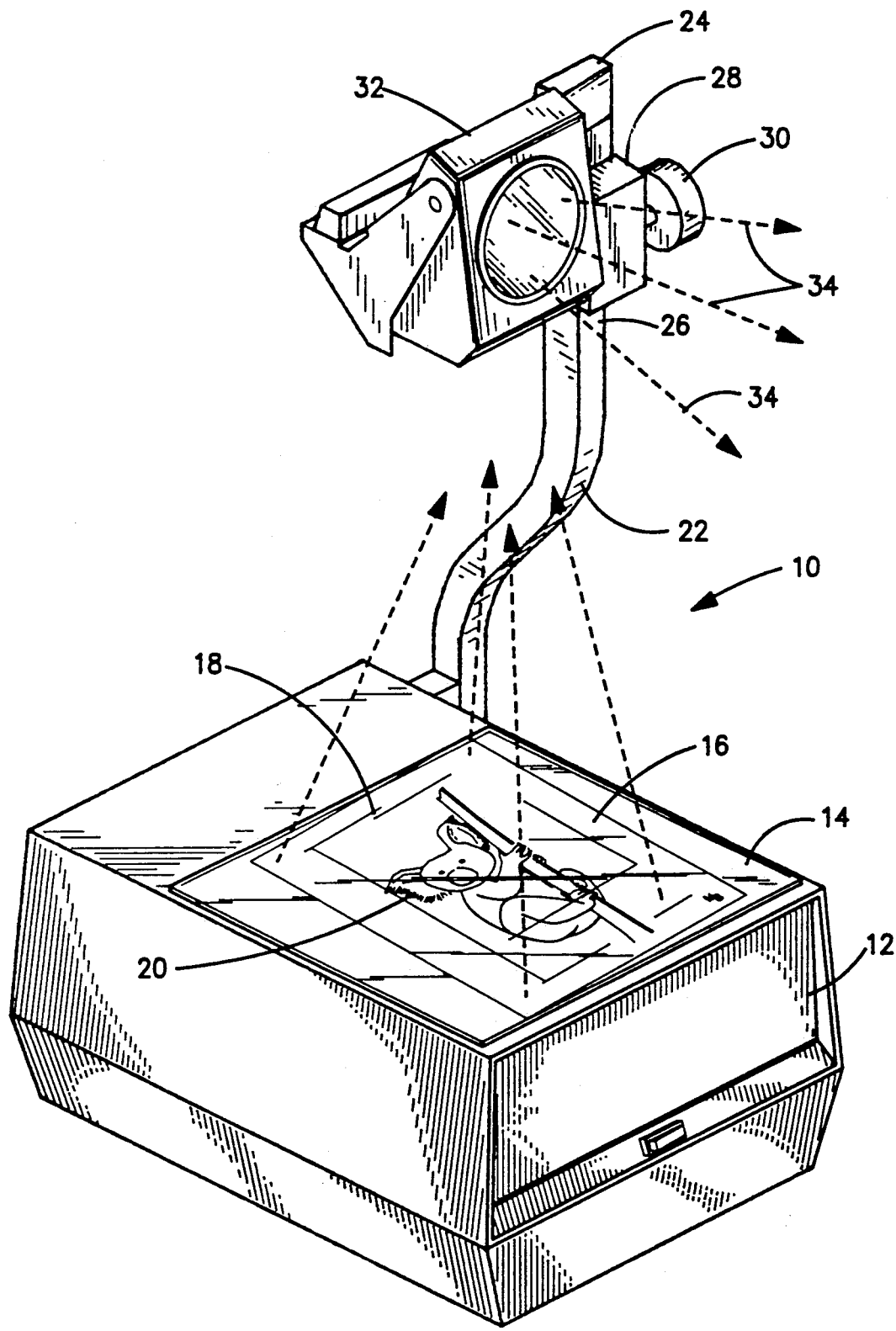
FIG. 1 is a perspective view of a prior art overhead projector.
Figure 2:
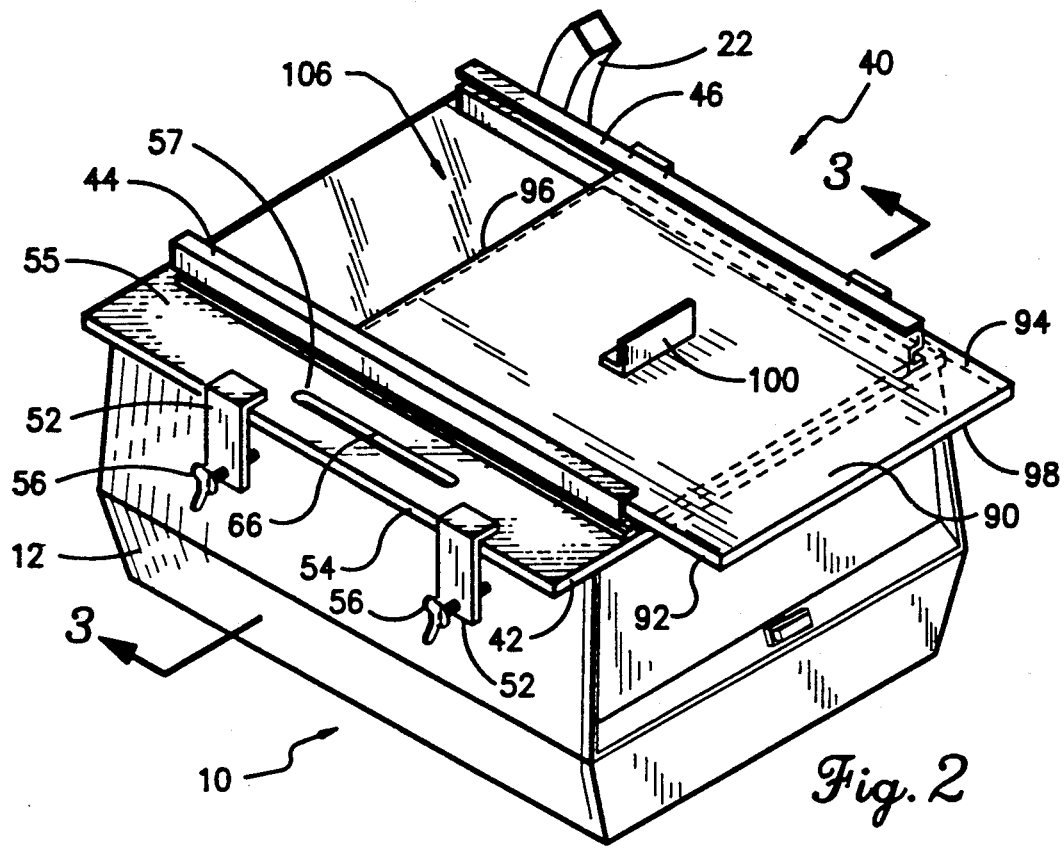
FIG. 2 is a perspective view of the light box of the overhead projector shown in FIG. 1 and incorporating the masking device according to the exemplary embodiment of the present invention.

With that in mind, and with reference to FIG. 1, it may be seen that the standard overhead projector 10 as known in the prior art includes a light box 12 that contains a light source and associated initial optics so that an upper light table 14 provides a frame support for a transparency 16 having an image to be projected, with this image including written information 18 and illustration 20. Naturally, other image information could be disposed on transparency 16, as well. A vertical support 22 extends upwardly from light box 12 and is mounted thereto. Vertical support 22 terminates at an upper end 24 and has an upper vertical section 26 provided with a lockable carriage 28 having locking knob 30 so that carriage 28 may be adjustably positioned along vertical section 26. Carriage 28 mounts a lens assembly or projector head 32 which includes a final optical elements whereby a projection beam, represented by arrows 34, containing image information from transparency 16, are horizontally directed as represented by arrows 36 so that the image may be enlarged and reproduced on a viewing surface so that observers may readily see the image. All of this, as noted above, is well known in the prior art.

Figure 3:
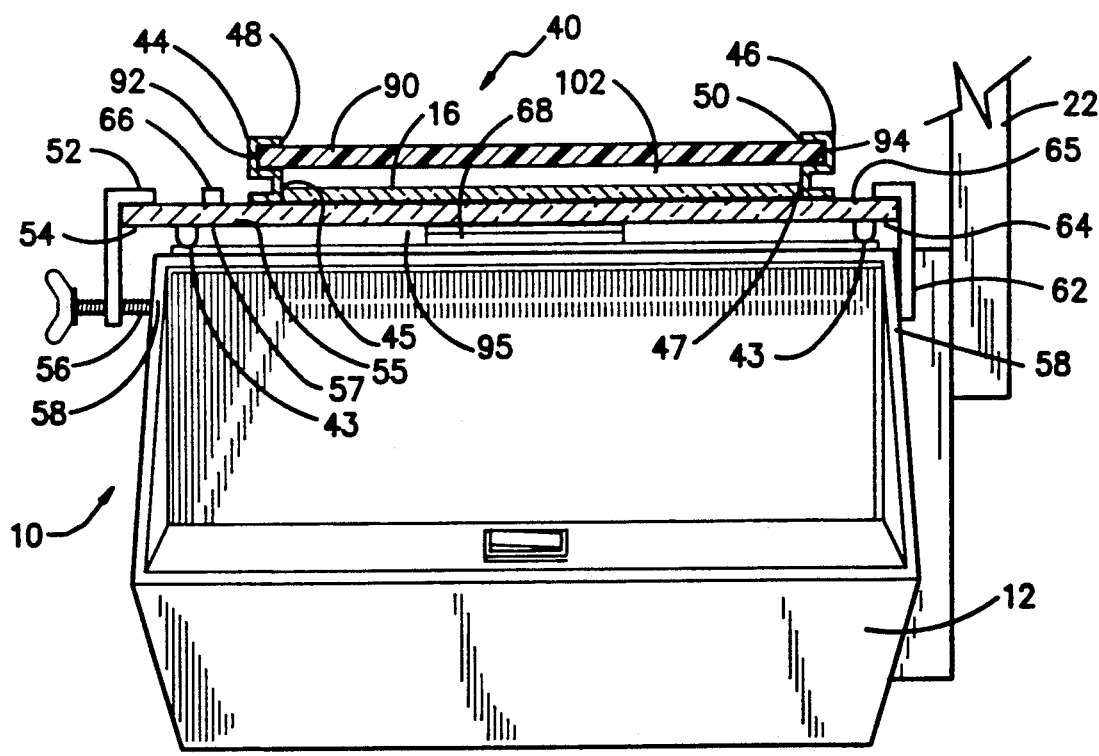
FIG. 3 is a cross-sectional view of the masking device shown in FIG. 2 taken about lines 3—3 of FIG. 2.

The present invention, in the form of masking device 40, may be best seen in FIGS. 2–5. Masking device 40 has an underplate or base plate 42 which is in the form of a continuous sheet of relatively rigid transparent material, such as plexiglas. First and second slideways in the form of S-shaped guide rails 44 and 46 are mounted, in any convenient manner, on base plate 42 and in parallel relationship to one another. Guide rails 44 and 46 may be conveniently constructed as identical aluminum extrusions, and, as best seen in FIG. 3, are oriented symmetrical to one another so that a pair of facing channels 48 and 50 are respectively defined by the upper portion of the respective guide rail 44 and 46. Channels 48 and 50, therefore, form the first and second slideways about an open region therebetween.

Masking device 40 is mountable on light box 12 of overhead projector 10 and, to this end, may be seen that a first pair of mounts 52 are attached to base plate 42 along a first side edge 54 thereof. Each of mounts 52 threadably receives a bolt 56 which may be tightened against an upper edge 58 of light box 12. Similarly, a second pair of mounts 62 are attached to base plate 42 at second side edge 64 thereof. Second mounts 64 abut upper edge 58 of light box 12. Mounts 52 and 62 provide for adjustable side to side mounting of masking device 40 onto light box 12. Due to the adjustability of threaded bolts 56, it may be seen that, within a range defined by the distance between mounts 52 and 62 as well as the length of bolts 56, masking device 40 may accommodate light boxes having differing widths. Side edge margins 55 and 65 are respectively adjacent side edges 54 and 64, respectively. If desired, on of these margins may be provided with a groove, such as groove 57, adapted to receive a visual presentation aid, such as a pointer 66.

Figure 4:
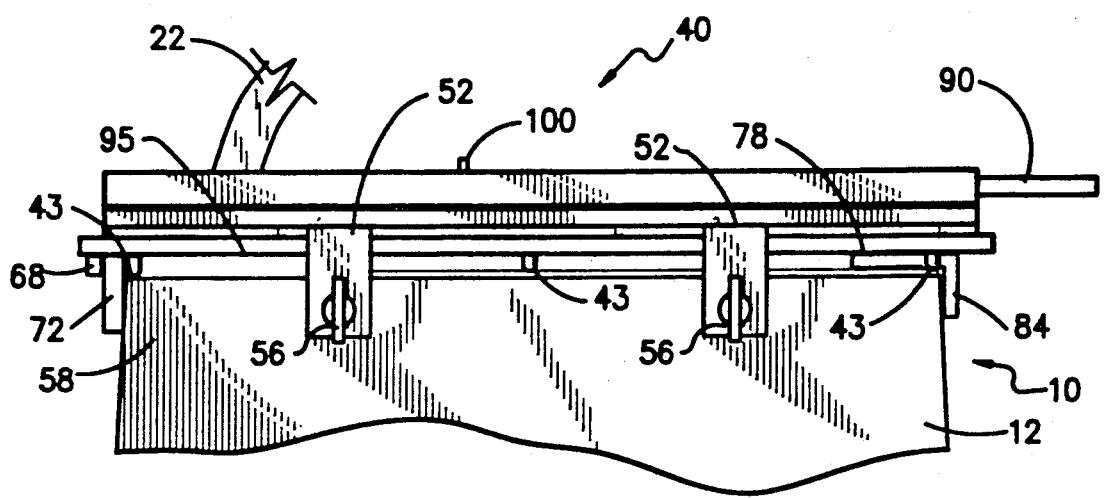
FIG. 4 is a side view in elevation showing the exemplary embodiment of the masking device of FIG. 2.
Figure 5:
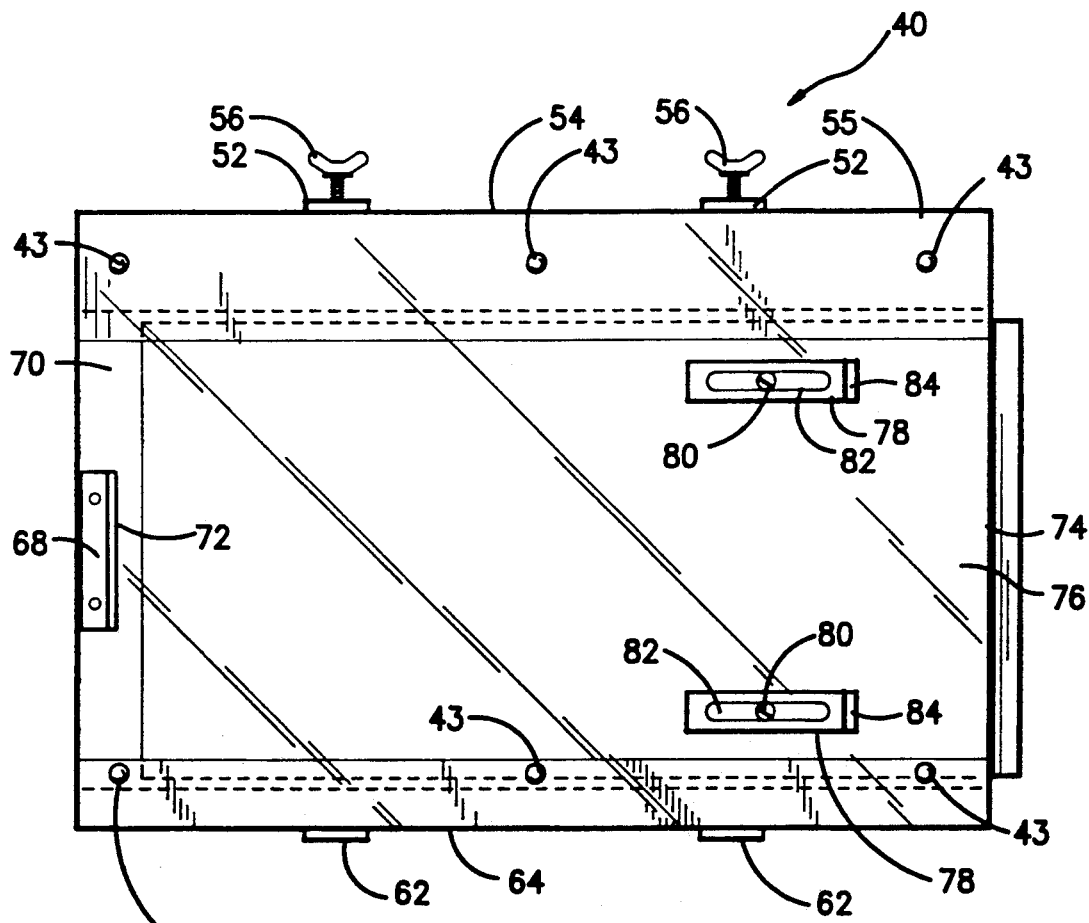
FIG. 5 is a bottom plan view of the masking device of FIGS. 2-4.

As is best shown in FIGS. 4 and 5, a first end mount 68 in the form of an aluminum angle piece, is attached to base plate 42 at back edge 70 thereof. Mount 68 includes a downwardly depending foot 72 which engages upper edge 58 of light box 12. Base plate 42 has a front edge 74 opposite back edge 70 and a front edge margin 76 adjacent front edge 74. A pair of slide mounts 78 are adjustably mounted to base plate 42 by means of releasable screws 80 which are received through a slot 82 in each slide mounts 78. Each of slide mounts 78 also include a downwardly depending foot 84 adapted to engage upper edge 58 of light box 12. Due to the use of screws 80 and end slots 82, the effective distance between foot 72 and feet 84 may be varied, again to allow adjustability for different sized light boxes of various overhead projectors. As is best shown in FIG. 4, front edge margin 76 is provided to overhang light box 12 and a forward portion of each of guide rails 44 and 46 extend along this overhanging portion.

Again referring to FIGS. 2–5, it may be seen that masking device 40 includes a shutter panel 90 having a panel side edge 92 received in channel 48 and an opposite panel side edge 94 received in channel 50. Thus, panel 90 is slideably received by guide rails 44 and 46 so that shutter panel 90 has a leading edge 96 and a trailing edge 98. A handle 100 is attached centrally to the upper surface of shutter panel 90 and provides a convenient manual grip so that shutter panel 90 may be slid back and forth in guide rails 44, 46. As is shown in FIG. 3, due to the S-shaped configuration of guide rails 44 and 46, shutter panel 90 is in spaced parallel relation to base plate 42 so as to form a chamber 102 therebetween. Transparency 16 may be located within chamber 102 and supported on base plate 42. Thus, base plate 42 protects light table 14 from scratches or other damage when overhead projector 10 is used. To this end, also spacers in the form of rubber feet 43 are employed to space base plate 42 slightly above and out of contact with light table 14 to create a ventilation space 95.

Figure 6:
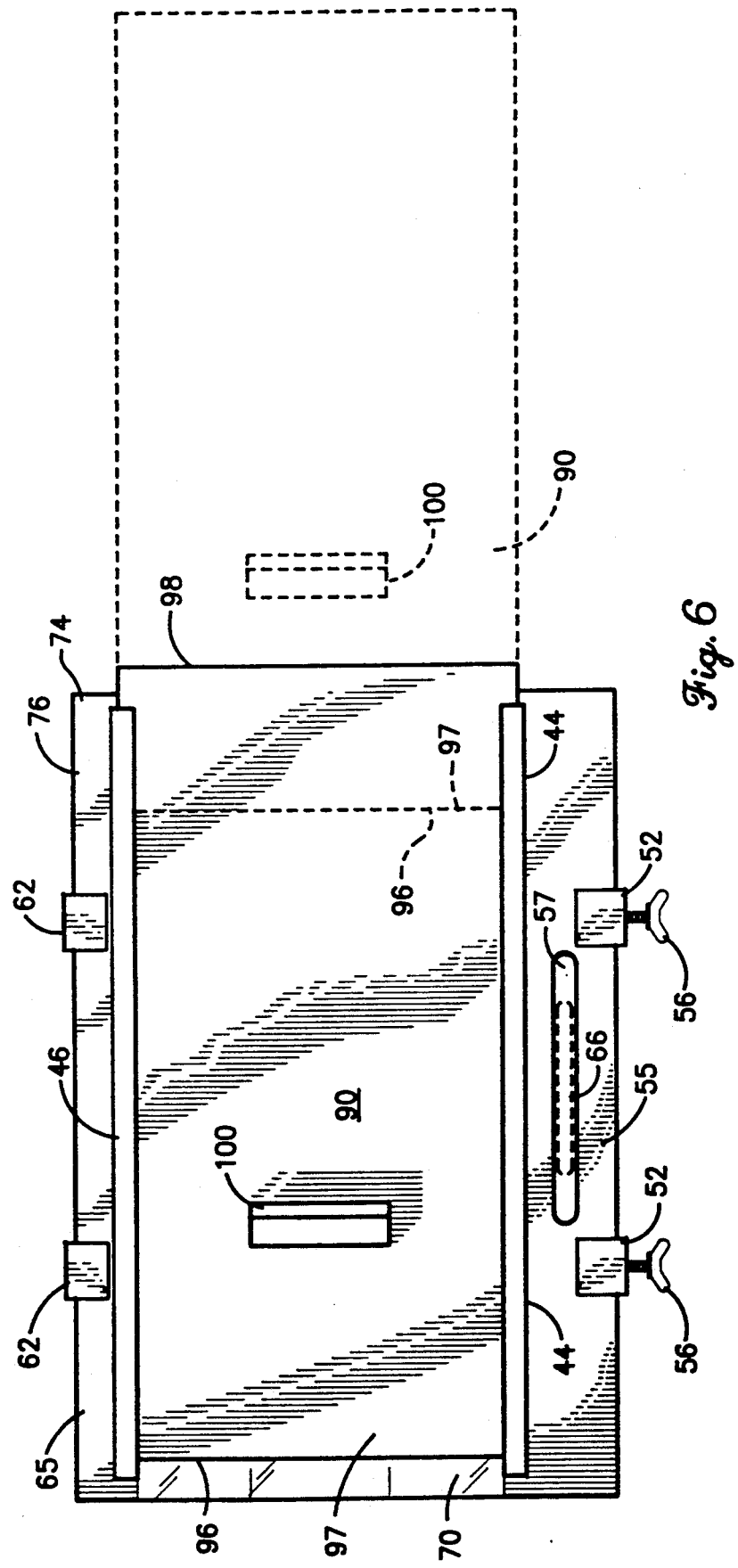
FIG. 6 is a top plan view of the masking device shown in FIGS. 2-5 and showing the shutter panel thereof in a masked positioned and, in phanthom in an unmasked position.
Figure 7:
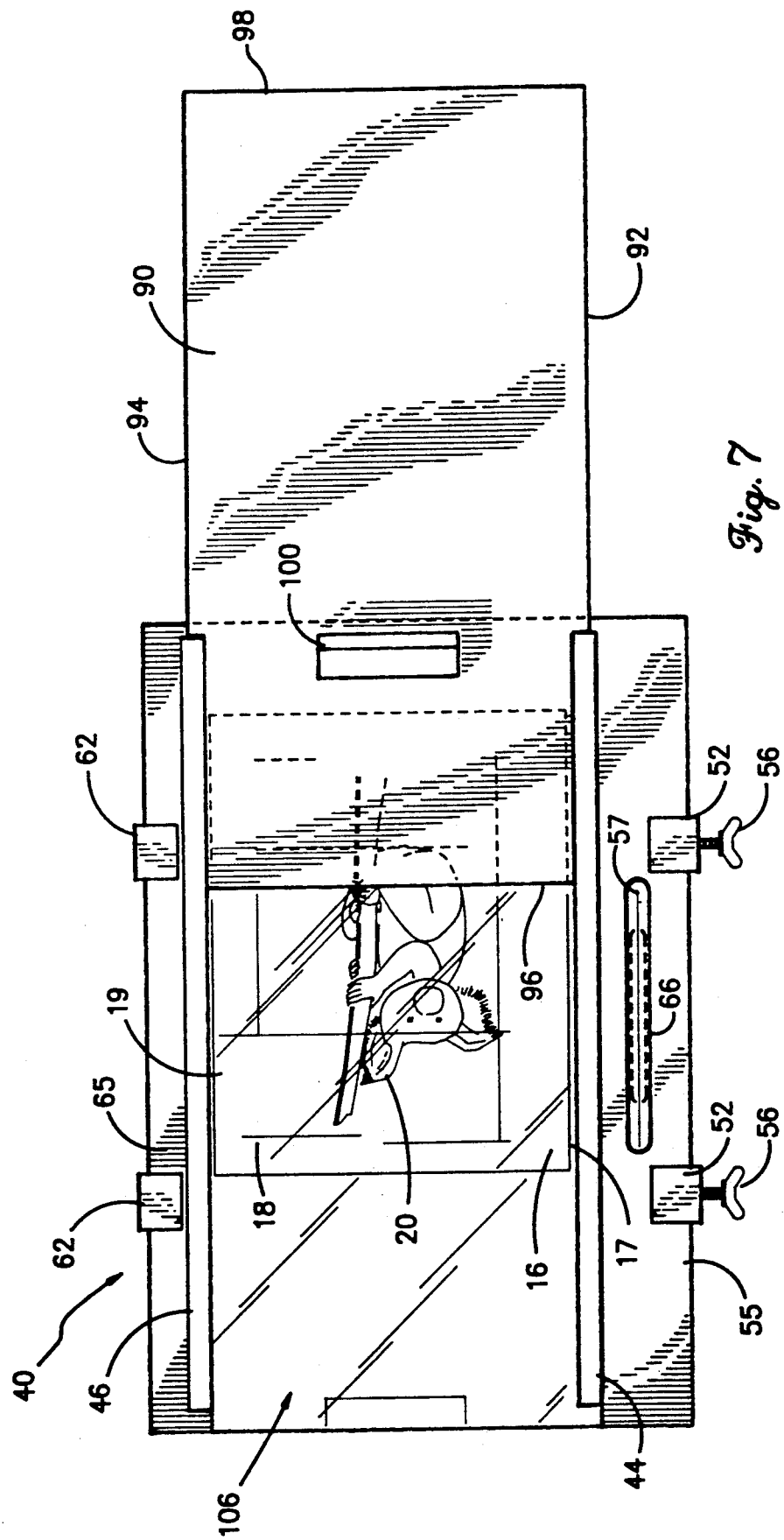
FIG. 7 is a top plan view of the masking device according to the present invention receiving and aligning a transparency.

The use of masking device 40, however, is best shown in FIGS. 6 and 7. In FIG. 6, it may be seen that slide panel 90 is in a masked position when trailing edge 98 is proximate front edge 74 of base plate 42. In the masked position, leading edge 96 of shutter panel 90 is proximate back edge 70 of base plate 42. As is shown in phathom, however, shutter panel 90 may be moved to an unmasked position wherein leading edge 96 is proximate front edge 74. To this end, also, it may now be seen that front edge margin 76 of base plate 42 allows guide rails 44 and 46 to extend forwardly of light table 12 and thus support a leading edge margin 97 of shutter panel 90 which margin is that portion of shutter panel 90 adjacent leading edge 96. Thus, shutter panel 96 is supported and stored in the fully unmasked orientation shown in phathom in FIG. 6. Also, it may be seen that margin 55, and margin 65, if desired can be opaqued (FIGS. 2 and 6) so that any portions thereof over light table 14 will block the projection beam.

As may now be appreciated with reference to FIG. 7, guide rails 44 and 46, along with base plate 42, define a framework assembly having an effective open region 106 between guide rails 44 and 46. Leading edge 96 of shutter panel 90 defines a continuous line of demarcation across opening 106. Thus, a leading portion of the open region 106, which is forward of leading edge 96, is unmasked relative to the projection beam 34. Likewise, a trailing portion of the opening 106 behind leading edge 96 is masked relative to the projection beam. Further, it may be seen that, the lower portions 45 and 47, respectively, of guide rails 44 and 46, adjacent base plate 42, provide means to align transparency 16. By way of example, as shown in FIG. 7, transparency 16 has sides edge 17 and 19 are that aligned, respectively, against guide rails 44 and 54; specifically, edges 17 and 19 are aligned against the lower portions 45 and 47 thereof. Thus, the text or written information 18 is placed parallel to leading edge 96 and illustration 20 is likewise aligned with respect to shutter panel 90. As transparency 16 is progressively unmasked, leading edge 96 will provide a line of demarcation that extends neatly and transversely across transparency 16. This is especially useful for textual material. This image and information on transparency 16 is also squared onto the viewing area by such alignment.

While shutter panel 90 may be constructed of any material suitable to block the projection beam 34, in the preferred embodiment, shutter panel 90 is constructed of a material which allows the projectionist to view the image of the transparency through shutter panel 90. This material used for constructing shutter panel nonetheless distorts or defuses projection beam 34 so that shutter panel 90 optically blocks the transmission of the image to the viewing screen without being opaque to the projectionist. This is of tremendous benefit to the projectionist since upcoming material to be unmasked may be studied prior to withdrawing shutter panel 90 to unmask the same. One such material that has been found suitable to accomplish this objective is tinted plexiglas. However, any such material having the above described operative properties is suitable in the preferred construction of shutter panel 90.

Figure 8:
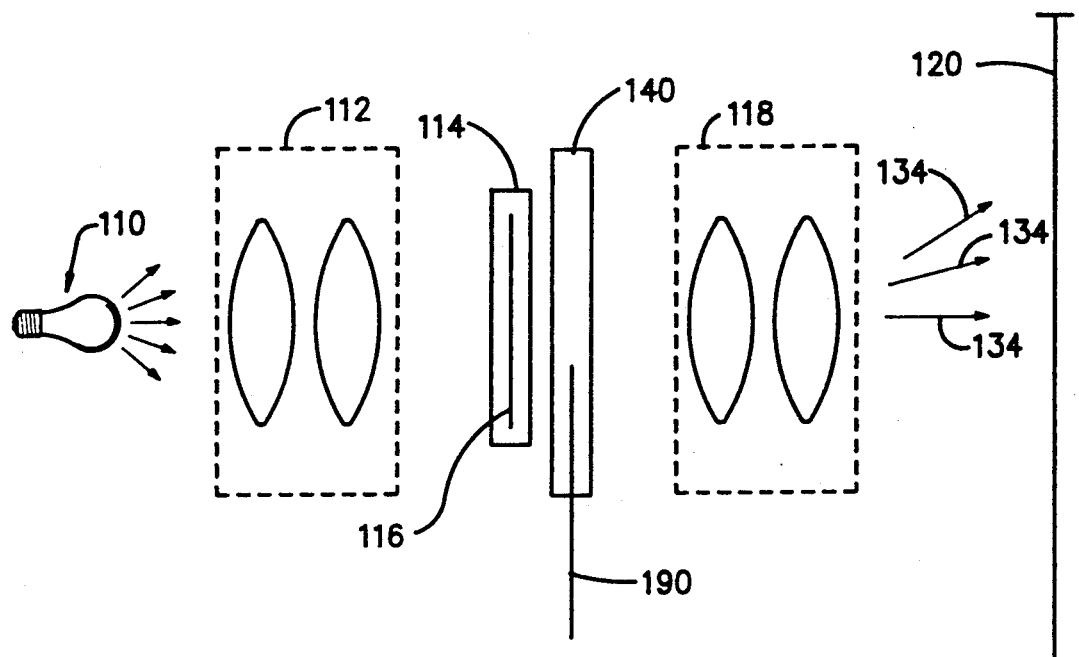
FIG. 8 is a diagrammatic view showing the generalized use of the present invention with projection apparatus.

The generalized embodiment of the present invention is accordingly shown in FIG. 8. Here, a projection apparatus is represented generally by a light source 110 first optics 112, a frame support 114 and second optics 118 so that a transparency 116 may be projected by projection beam 134 onto a viewing surface 120. Frame support 114 may be any of a variety known in the art so as to not include merely the light table 14 described above with respect to overhead projector 10. Rather, frame support 14 could be a mount for a transparency or other substrate on which is disposed an image for projection. In addition to light table 14 discussed above, this could include, by way of example, a slide mounting framework, as may be found in some slide projectors. Second optics 118 may or may not be present, depending on the type of projecting apparatus. It is important to appreciate from FIG. 8, however, that representative masking device 40 as herein described may be positioned proximate frame support 114 so that transparency 16 may be read through shutter panel 190 so that only a portion of the image represented by projection beam 134 appears on viewing surface 120.

Figure 9:
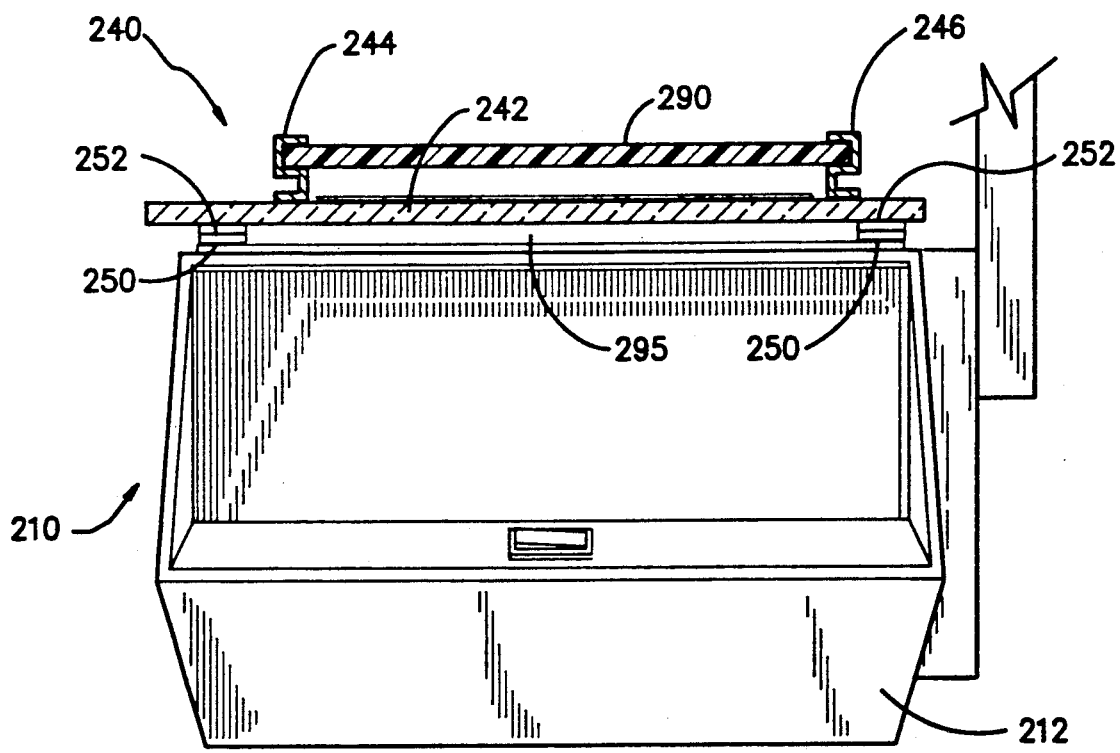
FIG. 9 is a cross sectional view, similar to FIG. 3 but showing an alternate fastening system for releasably securing the masking device to an overhead projector.

FIG. 9 shows an alternate embodiment of the present invention wherein the mounting structure operative to releasably secure the masking device to the projector is simplified. Here, masking device 240 has base plate 242 which mounts guide rails 244 and 246 as described in the preferred embodiment. Again, a shutter panel, such as shutter panel 290, is slideably received in guide rails 244 and 246. Base plate 242 is releasably fastened to light box 212 of projector 210 by a plurality of mated hook and loop (Velcro) fastening strips 250, 252. Preferably a mated pair is located at each corner of light box 212 on the upper surface thereof. Strips 250, 252 not only serve to attach base plate 242 to light box 212, but also act as spacers to create ventilation space 295.

FIG. 10 shows a final embodiment of the present invention wherein modification is made to the guide rail structure that forms the slideway for the masking panel. Here, masking device 340 is secured to projector 310 by means of pairs of mated hook and loop fastening strips 350, 352 in a manner similar to that shown in FIG. 9. Masking device 340 includes a base plate 342 on to which is mounted a pair of guide rails, such as representative guide rail 344, which slideably mount shutter panel 390. However, in this embodiment, shutter panel 390 is mounted in a suspension-type slide assembly 360. To this end, an intermediate slide bracket 362 is slideably received in guide rail 344 and shutter panel 390 is, in turn, slideably mounted in slide bracket 362. This slide assembly 360 accordingly performs a telescoping action during advancement and retraction of the shutter panel. This suspension-type slide assembly helps relieve stress on the over-hang 376 that could otherwise be present in the fully unmasked position such as may be seen with reference to over-hang 76 in FIG. 6.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A masking device adapted to be used in conjunction with a projection apparatus wherein said projection apparatus includes a frame support operative to receive and support a transparency containing an image to be projected, a light source operative to produce a projection beam of light and optical elements operative to direct the projections beam whereby the image may be projected by light source and said optical elements onto a viewing surface, the masking device comprising;

a frame work assembly on said projection apparatus proximate said frame support and having an open region through which the image is projected, said frame work assembly including first and second S-shaped guide rails parallel to one another on opposite sides of the open region so that said guide rails have facing U-shaped channel portions defining a slideway with there being a channel on each side of the open region and spaced above said frame support; and a shutter panel having an upper surface and lower surface, said shutter panel having a pair of side edges slideably received in said upper U-shaped channels with each side edge positively retained by a respective said guide rail with a portion of each guide rail extending along the upper and lower surfaces of said shutter panel, whereby said shutter panel is in a parallel spaced-apart relationship relative to a transparency received in said frame support and whereby a chamber is formed when said shutter panel is in the mask position so that air may circulate between said shutter panel and said transparency, said shutter panel movable between a mask position wherein the projection beam is substantially inhibited and an unmask position wherein the projection beam is transmitted, said shutter panel having a leading edge that extends across the open region perpendicularly from said first guide rail to said second guide rail whereby the leading edge defines a continuous line of demarcation across said opening and whereby a leading portion of the open region forward of the leading edge is unmasked relative to the projection beam and a trailing portion of the open region behind the leading edge is masked relative to the projection beam.

2. A masking device in accordance with claim 1 said guide rails each have a lower portion proximate said frame support and adapted to permit said transparency to be aligned relative to said shutter panel so that the image projected on the viewing surface is properly oriented for ease of viewing and so that the leading edge of said shutter panel extends transversely across said transparency.

3. A masking device in accordance with claim 2 wherein the transparency has a width and wherein the lower portions of said guide rails are spaced apart from one another a distance equal to the width of the transparency to be projected.

4. A masking device in accordance with claim 1 wherein said shutter panel is formed of a transparent material wherein said shutter panel in the masked position is adapted to permit a transparency image positioned proximate said image support to be viewed through said shutter panel yet wherein said projection beam is inhibited.

5. A masking device in accordance with claim 1 wherein said framework assembly includes a base plate adapted to be positioned proximate said frame support and wherein said guide rails are mounted on said base plate.

6. A masking device in accordance with claim 5 wherein said base plate is formed of an integral piece of transparent material.

7. A masking device in accordance with claim 5 including a plurality of spacers mounted on said base plate and contacting said frame support to define feet operative to support said base plate against said frame support.

8. A masking device in accordance with claim 5 wherein said base plate is oversized relative to said image support and is adapted to support said transparency.

9. A masking device in accordance with claim 8 wherein said guide rails extend a sufficient distance whereby said leading edge of said shutter panel can be positioned in a stored orientation such that that projection beam is not blocked.

10. A masking device adapted to be used in conjunction with an overhead projector wherein said overhead projector includes a light box and an upper surface forming a alight table that defines a frame support for a transparency to be displayed, said transparency having disposed thereon an image to be projected, a light source operative to produce a projection beam of light, and optical elements operative to direct the projection beam whereby the image be projected by said light source and said optical elements onto a viewing surface, the masking device comprising:

a framework assembly mountable on said light box promimate said light table, said framework assembly including a transparent base plate having side edges, a bottom surface adapted to be positioned proximate said light table and a top surface operative to support the transparency to be projected, and said framework assembly including first and second facing slideways parallel to one another on opposite sides of said base plate and spaced from the top surface thereof to define an open region through which the image may be projected; and a shutter panel slideably received by said slideways whereby said shutter panel is in a parallel spaced apart relationship relative to said base plate to define a chamber wherein air is permitted to freely circulate between said base plate and said shutter panel, said shutter panel having a leading edge and a trailing edge and being movable between a mask position wherein the projection beam is substantially inhibited and an unmask position wherein the projection beam is transmitted such that a leading portion of the open region forward of the leading edge is unmasked relative to the projection beam and a trailing portion of the open region behind the leading edge is masked relative to the projection beam.

11. A masking device in accordance with claim 10 wherein said leading edge extends across the open region from said first slideway to said second slideway and perpendicularly thereto whereby the leading edge defines a continuous line of demarcation across said opening.

12. A masking device in accordance with claim 10 wherein said framework assembly includes fastening means for mounting said masking device to said overhead projector.

13. A masking device in accordance with claim 12 wherein said fastening means includes a pair of loop and hook fasteners, having one of such pair secured to the bottom surface of said base plate and the other of such pair secured to said light box.

14. A masking device in accordance with claim 12 wherein said fastening means includes at least one bracket secured to said base plate, and an adjustable fastening element, said bracket and said adjustable fastening element operative to clamp onto said light box whereby said base plate is securely mounted thereto.

15. A masking device in accordance with claim 10 wherein said base plate has side edge margins proimate each respective side edge and on a side of a respective slideway opposite the open region and wherein at least one of said margins has means for holding visual presentation aids.

16. A masking device in accordance with claim 15 wherein said means for holding includes a groove in one of said side edge margins, said groove positioned parallel to said side edges.

17. A masking device in accordance with claim 10 including a plurality of spacers secured to said bottom surface and adapted to be positioned on said light box so that said base plate is positioned in a spaced apart relationship to said light table to create a ventilation space whereby the heat generated by said light source is not trapped between said overhead projector and said underplate.

18. A masking device in accordance with claim 10 wherein said shutter panel is formed of light diffusing material, whereby said transparency image underlying said masked portion is not projected onto said view surface.

19. A masking device in accordance with claim 18 wherein said light diffusing material is plexiglas.

20. A masking device ion accordance with claim 19 wherein said plexiglas is tinted.

21. A masking device in accorrdance with claim 10 wherein said base plate has side edge margins proximate each respective side edge and on a side of a respective slideway opposite the open region, said side edge margins being opaque to prohibit transmission of light therethrough.

22. A masking device in accordance with claim 10 wherein said facing slideways are formed by a pair of guide rails and including a suspension-type slide assembly mounted for sliding movement with respect to each said rail guide, said shutter panel being slideably mounted in said slide assemblies.

23. A masking device adapted to be used in conjunction with an overhead projector wherein said overhead projector includes a light box and an upper surface forming a light table that defines a frame support for a transparency to be displayed, said transparency having disposed thereon an image to be projected, a light source operative to produce a projection beam of light, and optical elements operative to direct the projection beam whereby the image may be projected by said light source and said optical elements onto a viewing surface, the masking device comprising:
   a frame work assembly on said projection apparatus proixmate said image support and having a region through which the image is projected, said frame work assembly including a pair of parallel slideways spaced above said image support, a shutter panel slideably received by said slideways whereby said shutter panel is in parallel spaced-apart relationship relative to a transparency received on said frame support and whereby a chamber is formed when said shutter panel is in a mask position so that air may circulate between said shutter panel and said transparency, said shutter panel movable between a mask position wherein the projection beam is substantially inhibited and an unmask position wherein the projection beam is transmitted, said shutter panel having a leading edge that extends across the region whereby the leading edge defines a line of demarcation and whereby a leading portion of the region forward of the leading edge is unmasked relative to the projection beam and a trailing portion of the region behind the leading edge is masked relative to the projection beam, said shutter panel being formed of a transparent material wherein said shutter panel shutter panel in the masked position is adapted to permit a transparency image positioned proximate said frame support to be viewed through said shutter panel yet wherein said projection beam is inhibited.

24. A masking device in accordance with claim 23 wherein said shutter panel is formed of light diffusing material, whereby said transparency image underlying said masked portion is not projected onto said view surface.

25. A masking device in accordance with claim 24 wherein said light diffusing material is plexiglas.

26. A masking device in accordance with claim 25 wherein said plexiglas is tinted.

27. A masking device adapted to be used in conjunction with an overhead projector wherein said overhead projector includes a light box and an upper surface forming a light table that defines a frame support for a transparency to be displayed, said transparency having disposed thereon an image to be projected, a light source operative to produce a projection beam of light, and optical elements operative to direct the projection beam whereby the image may be projection by said light source and said optical elements onto a viewing surface, the masking device comprising:
   a framework assembly mountable on said light box proximate said light table, said framework assembly including a transparent base plate having side edges, a bottom surface adapted to be positioned proximate said light table and a top surface operative to support transparency to be projected, and said framework assembly including first and second guide rails forming first and second facing slideways parallel to one another on opposite sides of said base plate to define an open region through which the image may be projected, said framework assembly incliuding a suspension-type slide assembly mounted on each of said guide rails; and
   a shutter panel slideably received by said slide assemblies and moveable between a mask position wherein the projection beam is substantially inhibited and an umasked position wherein the projection beam is transmitted.

* * * * *